United States Patent [19]
Pittman et al.

[11] 3,856,474
[45] Dec. 24, 1974

[54] BITUMEN EXTRACTION APPARATUS INCLUDING ENDLESS PERFORATE CONVEYOR AND PLURAL SOLVENT-SPRAY MEANS

[76] Inventors: Tobe A. Pittman, 1517 Ninth St., Centerville, Utah 84014; Jack L. Woods, 1409 Walker Bank Building, Ogden, Utah 84111

[22] Filed: Feb. 4, 1974

[21] Appl. No.: 439,442

[52] U.S. Cl. ............... 23/267 R, 23/269, 23/270 B, 196/14.52, 208/11
[51] Int. Cl. ......................... B01d 11/02, C10c 3/08
[58] Field of Search ......... 196/14.52 RD; 23/267 R, 23/269, 270 B, 272.6 S; 208/11, 8

[56] References Cited
UNITED STATES PATENTS

| | | | |
|---|---|---|---|
| 996,081 | 6/1911 | Guillaume | 23/272.6 S |
| 1,060,010 | 4/1913 | Murray | 23/272.6 S |
| 2,273,557 | 2/1942 | Bonotto | 23/270 B |
| 2,451,081 | 10/1948 | Ford | 23/270 B |
| 2,453,633 | 11/1948 | Logan | 23/272.6 S |
| 2,684,288 | 7/1954 | De Sinet | 23/270 B |
| 2,686,192 | 8/1954 | Bonotto | 23/270 B |
| 2,907,640 | 10/1959 | Konig | 23/270 B |

*Primary Examiner*—Wilbur L. Bascomb, Jr.
*Assistant Examiner*—S. J. Emery

[57] ABSTRACT

Apparatus for recovering bitumen from crushed rock containing the same, such apparatus including an endless conveyor which passes through a series of spray stages. Solvent sprayed into and through the crushed ore carries oil or bitumen therewith through a series of pools. These pools are defined by weir structures such that the overflow of the last pool flows into the next preceding pool, and so forth. In this way, only clean solvent is needed solely for the last stage, whereas pumped solutions of the preceding stages are used for re-spray at the respective stages. The oil and solvent solution is passed into a collection chamber wherein the solvent is vaporized, condensed, and collected for re-use in the system. The materials remaining will comprise the ore or bitumen which may be routed to a refinery, fractionation, or distillation column. Means may be provided for condensing solvent vapors and also for vaporizing the same prior to such condensation. Where a distillation column, fractionating column, or refinery is inherent in the system, then a selected fraction may be used as a source of heat to operate necessary heat and/or electrical generating means for powering the system.

3 Claims, 6 Drawing Figures

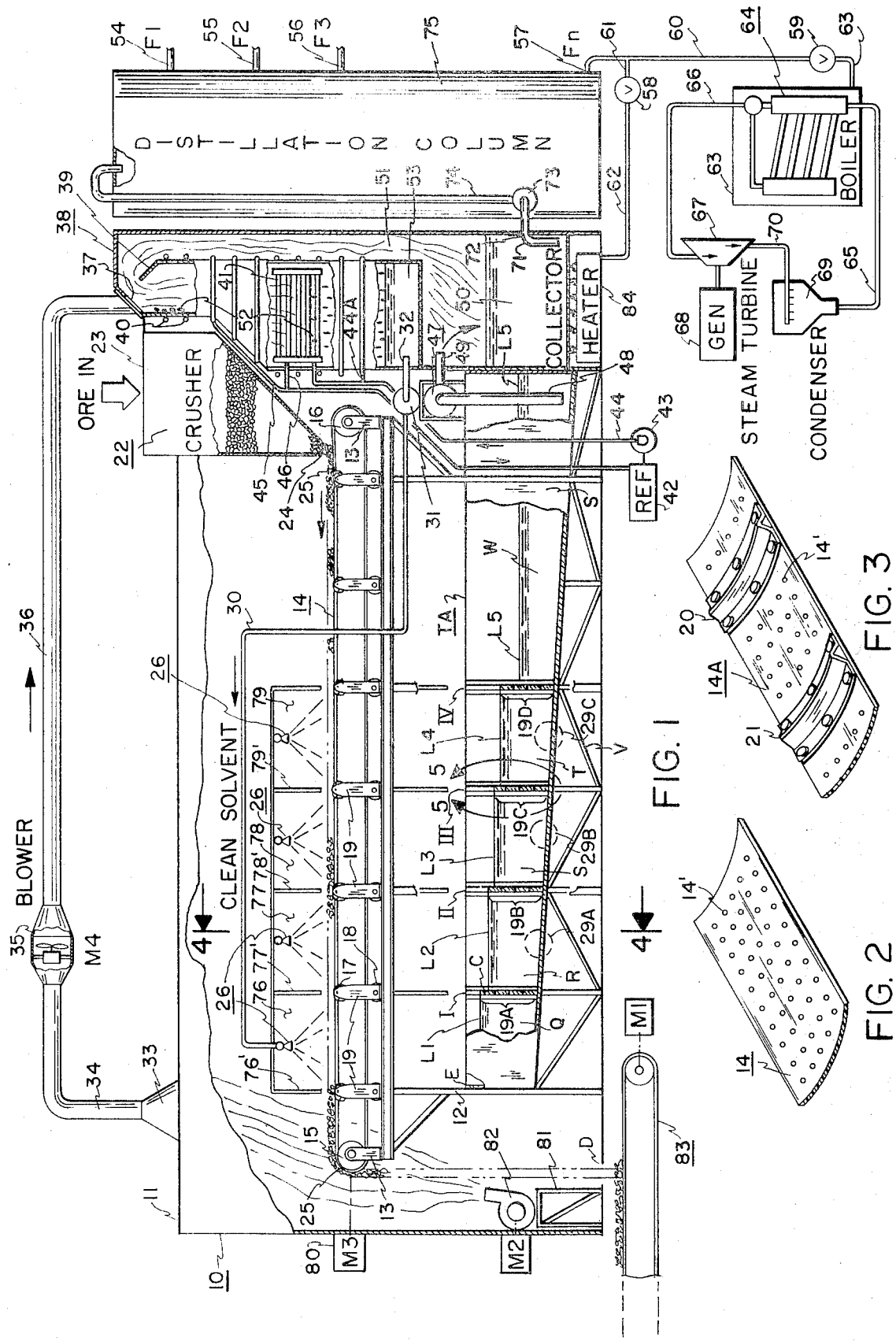

BITUMEN EXTRACTION APPARATUS INCLUDING ENDLESS PERFORATE CONVEYOR AND PLURAL SOLVENT-SPRAY MEANS

The present invention relates to apparatus for recovering bitumen or oil from crushed rock, and more particularly, to a new and improved structure which utilizes the advantageous features of spraying crushed rock as the same progresses along a continuous route, and then advantageously collecting solutions produced from such spraying for further processing.

Terminology herein is now explained. Oil shales of various types contain, in addition to minteral matter, an organic material commonly referred to as "kerogen." Kerogen is a mixture of high molecular-weight compounds of carbon. hydrogen, nitrogen, and so forth. Kerogen is soluble, in limited degree, in certain organic solvents. For maximized recovery, in the usual case, oil shale containing kerogen is heated to cause rupture of the chemical bonds present and hence, by thermal degradation, tends to liquify in the kerogen.

Tar sands or oil sands differ in many characteristics from oil shale, among which is the condition that the hydrocarbon bituminous material contained in tar sand is largely soluble in oil solvents without any application of heat. Recovery through the solvent process, in the case of oil shale, is quite limited but still can be useful commercially. The words "oil" and "bitumen" shall be used herein to designate bituminous recovery from both oil shale and also tar sands or oil sands.

Where oil shale is being processed in the present invention, to achieve extraction in commercial quantities, the oil should be preheated prior to and/or after the pressure stage. Of course, some recovery can be had even without heating.

The present invention is particularly directed to the recovery of bitumen or oil from tar sands or oil sands as they are known in the art. An endless perforated conveyor belt is used and a spray technique employed such that a maximum of recovery can be had with the minimum use of solvent.

Spray pools are recovered below the endless conveyor belt and are cascaded such that the most oil-rich pool occurs most proximate the forward end of the conveyor and nearest to the collector in which the solution of the pool is pumped.

Variable weir features are utilized to effect the cascading necessary. The system is so arranged that clean solvent need only be used to spray the last sector of a run. Other spray compartment areas simply have recovered solutions recirculated through the spray mechanism. A portion of the recovered petroleum product may be used as an energy source for supplying heat, refrigeration and other power were needed.

Accordingly, a principal object of the present invention is to provide new and improved apparatus for processing bitumen-containing crushed rock.

An additional object is to provide apparatus for processing oil sands to achieve a maximum recovery therefrom.

A further object is to provide apparatus for processing oil or sands which is of a continuous nature and incorporates a spray technique requiring a minimum of fresh solvent.

An additional object is to provide apparatus for processing oil sand wherein a minimum of solvent is needed to recover bitumen from the oil sands being processed.

A further object is to provide an oil-sand processing apparatus wherein a minimum of heat and water is needed.

The features of the present invention may best be understood by reference to the following description taken in connection with the accompanying drawings in which:

FIG. 1 is a side elevation, partially cut away, of the apparatus of the present invention, with a side thereof being removed to show the conveyor structure.

FIG. 2 is a fragmentary perspective of a portion of the conveyor belt utilized in FIG. 1.

FIG. 3 is similar to FIG. 2 but illustrates an optional or alternate belt that can be used.

Figure 6:
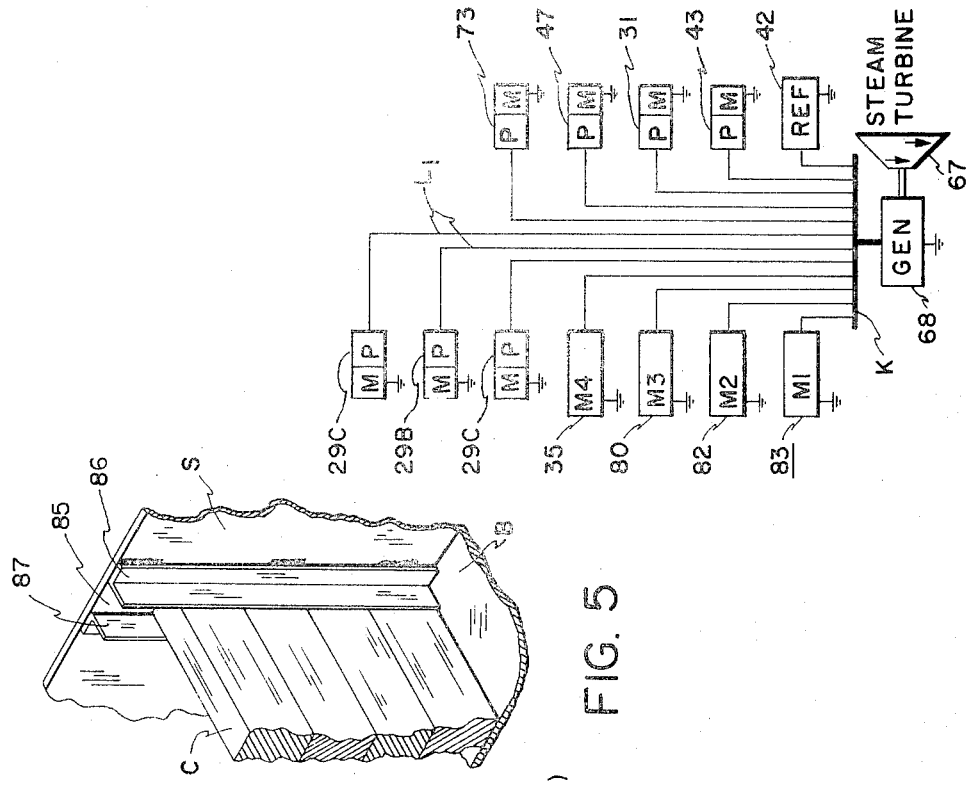
FIG. 6 is a schematic illustrating the manner in which power is supplied to various motors and pumps in the system.

In FIG. 1 apparatus 10 includes an enclosure housing 11. The same provides a complete enclosure for the structure provided endless conveyor belt 14, but does include a slot D for permitting passage therethrough of spent ore to endless conveyor 83 driven by motor M1. Such spent ore of the process about to be described may be used for further processing or simply for disposal.

Disposed within housing 11 is a frame structure 12 which includes upstanding end roller yoke supports 13 at either end of the structure. Two such support yokes respectively journal discharge end roller 15 and feed end roller 16.

Also included with respect to frame 12 are series of upstanding yokes or U-shaped members 19, the same journalling idler rollers 17 and 18 at each respective location. Accordingly, the endless conveyor belt travels about the idler rollers and also the end rollers 15 and 16 in the manner shown to convey crushed ore 25 from right to left.

The conveyor belt 14 is perforate and may be of any suitable metalic, web, or elastomeric material. In any event, the belt will have the series of perforations 14', the purpose for which will be explained hereinafter. As an alternate to the belt 14 of FIGS. 1 and 2, there may be provided a substitute belt 14 employing spaced cleats 20 and 21, where this is deemed desirable for ore conveyance.

Figure 5:
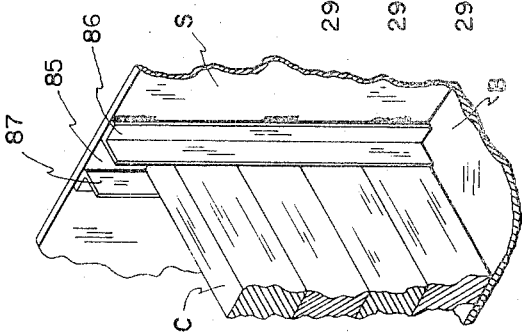
FIG. 5 is a fragmentary perspective illustrating one way in which the weir structure may be constructed and assembled.

A solution-collection tank T is provided and is preferably supported by the frame 12 having support bracing V. The solution collection tank includes closed opposite ends E, closed opposite sides S, and bottom B, all being integrally formed. FIG. 5 illustrates that welded to the sides S will be a series of angles 86 and 87 to provide for a slot 85. Opposed slots are provided to receive one or more weir members C. These may be unitary or may be stacked vertically as shown in FIG. 5. Multiple element weirs as shown in FIG. 5 are preferred in some applications since the fluid level may be incrementally adjusted as appropriate for each collection section as hereinafter described.

At this point, it is appropriately mentioned that bitumen-solvent solution pools will establish fluid levels L1–L5 within respective solution compartments or volumes Q, R, S and T. The final compartment or volume at W directly supplies the suction conduit 48 of pump 47.

Figure 4:
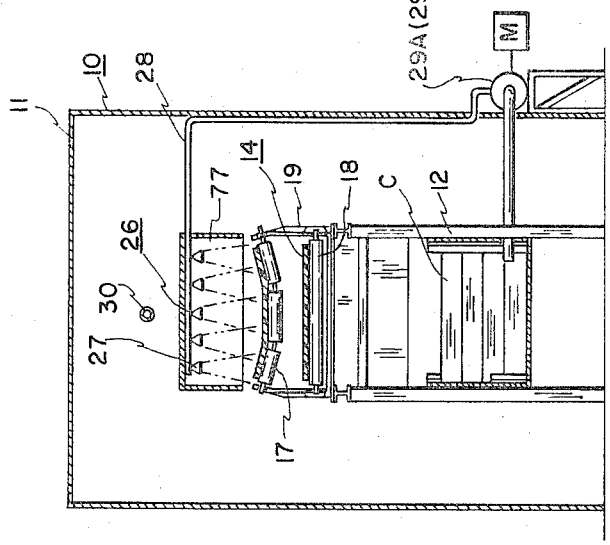
FIG. 4 is a transverse section taken along the line 4—4 of FIG. 1 and illustrates that each compartment or section of the processing unit has its own pumping and spraying system.

In returning to the input end of the endless conveyor at roller 16, it is seen that the apparatus is supplied a fixedly supported crusher 22 having inlet opening 23 and outlet opening 24. Crushed ore proceeds, hence, from the interior of the hopper to appear as a layer 25 on the upper side of the endless conveyor 14. As the layer of ore, preferably not more than 1½ inches thick, and preferably crushed to pass a minus twenty screen mesh, proceeds from right to left on the conveyor belt, the same will pass underneath sprays as are given by spraying means 26 within the several compartments 76–79. This spraying means is shown in detail in FIG. 4, wherein a respective spraying means is supplied at 29 to which conduit 28 is connected. A series of spray nozzles 27, of standard form, are secured to conduit 28 of the means 26 such that these sprays spray downwardly upon the crushed ore of conveyor belt 14 in FIG. 4. It will be observed that each of the compartments formed by the inter-compartment partitions, i.e., weirs 19A–19D and compartment walls 76'–79', will have an independent spraying means 26. Thus, each of the compartments includes its own respective pump 29A–29C and respective conduit (28) and spray means. Accordingly, each compartment has its own spray circuit.

Collector unit or chamber 38 includes a vaporization baffle 39; disposed within the interior of unit 38, preferably, is a condenser structure 41, the purpose for which will be hereinafter described. With respect to collector unit 38, the same receives pressure conduit 49 of pump 47, thereby receiving bitumen or oil dissolved within the solvent within the collector chamber as indicated at 50.

A coolant conduit 40 may be disposed about the condenser chamber of structure 38. Thus, the cooling means associated with the structure proximate 53 may be performed either exterior to the structure by virtue of coolant conduit 40, or may be performed interior of such structure by a condenser 41. Such cooling effect may be performed by circulating tap or stream water, or there may be provided a refrigerant and compressor 42 which, with refrigerant pump 43, comples the circuit as by supply conduit 44, supply conduit stub 44, return conduit 45, and return conduit stub 46. These are all connected together in a conventional manner as shown in FIG. 1.

The purpose for the baffle 39 is to direct ascending vapors 51 from the pool 50 upwardly and to the right so that the same falls down as condensation or collects upon condenser 41. A visual indication of such condensed vapors is given at 52, which condensation settles at 53 for subsequent re-use.

Conduit 32 serves as an outlet for the condensed solvent at 53, and pump 31 serves to receive such solvent and supply the same under pressure via conduit 30 to the several spray means 26

The outlet of the collector unit 38 in FIG. 1 receives fluid at 50 and routes the same, via pump 73, aperture 72 and conduit 74 to the top of the conventional refinery, fractionation, or distillation column 75. Such structure 75 includes outlets 54–56 for recovering desired fractions F1–F3 in the usual manner and, in addition, supplies a fraction Fm at conduit outlet 57. This fraction will be in the heavier region, such as conventional refining bottoms or heavy fuel oil, which may be conducted by connection 57 and conduit 60 to and through manual control valves 58 and 59. Conduit 62 interconnects valve 58 with heater 84, and valve 59 is connected to the boiler as indicated by conduit 63'. Conduit 65 interconnects the boiler 63 with condenser 69. Conduit 66 interconnects steam turbine 67 with the boiler 63. Generator 68 is mechanically coupled to steam turbine 67 in the manner indicated, and conduit 70 serves as a spent steam return to condenser 69, such condensation to be fed by pump or other means to the boiler in a usual manner.

With rspect to the tank TA, it is noted that the same is divided into compartments by the weir structures 19A–19D, these being made up of one or more weir members C, see again FIG. 5. The weirs are constructed such that each successive weir, going from left to right, is at a progressively lower height. Thus, there is had a series of cascading pools having liquid levers L1–L5 as indicated. The purpose for this is to make the pools successively richer as the collection chamber is approached.

It is noted that crushed ore therefore is received by the crusher at 25 and is conveyed through the system from right to left. The clean solvent which is conducted by conduit 30 is sprayed onto the crushed ore at the respective compartments, i.e., at 76–79, and such solvent carries with it the oil or bitumen of the crushed ore. The solvent and entrained oil passes through the apertures or holes of the conveyor, the same falls into the pools of compartments Q–W. The fact of independent circulatory systems for each of the compartments is to be noted.

As to nomenclature with reference to FIGS. 1, M and P within blocks, see FIG. 6, indicates motors, pumps and motors driving otherwise identified pumps.

It is seen in FIG. 1 that the clean solvent is routed through conduit 30 solely to the foremost compartment at 76, whereas the solution below each of the prior stages are recirculated in such stages for further recovery of bitumen from the crushed ore as the same passes through the route shown. By such method the quantity of clean solvent needed is greatly reduced, and simply performs the final step of cleansing any remaining ore or bitumen from the processed crushed shale at its last stage. The solution pools at S and T, for example, both containing oil, may be recirculated through new ore passing into these chambers so as to enhance recovery.

The purpose for the cascading pools by virtue of the weir construction is simply to ensure that the progressively "dirtier" solvent, that is, the solvent which includes the most oil or bitumen, runs progressively rearwardly to pool W forming fluid level at L5 and leading to the recovery chamber. Thus, the pool having level L1 will have the least oil entrained whereas the pool at L5 will have the most oil entrained. Accordingly, only a small amount of solvent is needed for spray appreciation, i.e., at the last stage of the recovery process.

Accordingly, the oil and solvent mixture is taken at conduit 48 and is exhausted into the collector by virtue of pump 47. In the collector are structure 38, the solvent will gradually vaporize under ambient temperature conditions, say from 60°–100°F. This is particularly true where one of the three following solvents is used: methylchloroform, trichloroethylene, and perchloroethylene. These solvents are highly preferred since they have low heats at vaporization, low specific heats, are not flammable.

Where it is desired to speed the vaporization process of the solvent within the solution at 50, then heater 84 may be supplied with an appropriate fuel fraction from column 75, this is indicated in FIG. 1. Cooling of the collector structure at 38 is accomplished by either the interior condenser or by exterior coolant pipes, the same activated by refrigerant 42 of any conventional form in combination with refrigeration pump 43 in the usual manner.

In addition to supplying heat and coolant, the fraction taken at F$n$, 57 in FIG. 1, may also be used to actuate a steam turbine and electrical generator, see 68 in FIG. 1, which will supply power to the various motors and pumps used in the system, see FIG. 6. These elements will be supplied power by leads $L_1$ connecting to the bus bar K of the electrical circuit of FIG. 6. Where it is desired, a motor-driven blower at 82 be provided so as to blow any vaporized solvent or fumes up the stack including section 33 and conduit 34 & 36. This is performed by blower 35 which uges such fumes back into the collector structure at 38. In being positioned above the slot P, the blower 35 not only dries the final run of spent ore but also eliminates essential loss of the solvent either in vapor or liquid form.

Accordingly, what is presented is new and useful apparatus for processing bitumen containing crushed rock such as oil sand and tar sand, wherein an essentially enclosed system is used to keep solvent loss at a bare minimum, and which does not require the use of water in any essential degree. A closed system coolant such as is common in conventional refrigeration systems may be used in a system, or if desired, spring, stream or tap water may be used for such cooling as may be needed at collector chamber structure 38. For certain ware environs, the solvent itself will automatically vaporize itself, and only a circulating stream or line of fresh water or other heat-exchange coolant will be needed to condense the same for re-use.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

We claim:

1. Apparatus to effect the extraction of bitumen from bitumen-containing crushed ore, including, in combination: a series of fixed, mutually horizontally spaced, solvent spray means for spraying crushed ore with bitumen solvent; movably revolvable endless conveyor means proximately disposed underneath said solvent-spray means, having a feed end and a discharge end, and including an endless perforate conveyor belt for transporting a layer of crushed ore operatively past said solvent-spray means, for producing, as a downfall therefrom, a bitumen-solvent solution; a series of fixed, mutually horizontally spaced, depending walls forming respective zones including said spray means, respectively, said walls depending toward but being proximately spaced with respect to said endless conveyor belt, whereby to permit a layer of ore, carried by said endless conveyor belt, to pass in proximately underneath said walls; means for containing said solution disposed underneath said conveyor belt; said endless conveyor belt including upper and lower, oppositely traveling courses, said containing means being disposed beneath both courses and including transverse means defining contiguous, solution-collection chambers constructed for a maximum fluid level which is progressively lower as one progresses from said discharge end of said endless conveyor means to said feed end thereof; means disposed essentially above said containing means for receiving and condensing solvent vapors from said solution, to form a condensate; means coupled to said receiving means for routing such condensed solvent back to at least one of said solvent-spray means; enclosure means surrounding said spraying means and said endless conveyor means for preventing escape of solvent vapors, beneath said enclosure means including a spent-ore exit opening disposed beneath said discharge end of said endless conveyor belt, blower means constructed and positioned proximate said opening to force solvent vapors away from said opening and within said enclosure means; and said enclosure means including a blower provided exhaust vent means disposed above said discharge end of said endless conveyor belt for exhausting solvent fumes back to said receiving and condensing means.

2. The apparatus of claim 1 wherein said walls include fixed structure forming compartment enclosures having open bottoms proximate to, yet allowing for an ore-travel-path spaced above said endless conveyor belt.

3. Structure according to claim 1 wherein said transverse means are weirs respectively including plural, essentially vertically aligned and stacked weir members, and means for retaining said weir members in position.

* * * * *

UNITED STATES PATENT OFFICE
CERTIFICATE OF CORRECTION

Patent No. 3,856,474  Dated December 24, 1974

Inventor(s) Pittman, Tobe A., and Woods, Jack L.

It is certified that error appears in the above-identified patent and that said Letters Patent are hereby corrected as shown below:

Addresses of inventors should read:

Mr. Tobe A. Pittman
    603 South 400 West
    Centerville, Utah

Mr. Jack L. Woods
    1517 Ninth Street
    Ogden, Utah

Signed and sealed this 17th day of June 1975.

(SEAL)
Attest:

RUTH C. MASON
Attesting Officer

C. MARSHALL DANN
Commissioner of Patents
and Trademarks